United States Patent [19]
Ueno et al.

[11] 4,365,048
[45] * Dec. 21, 1982

[54] METHOD FOR POLYMERIZING α-OLEFIN

[75] Inventors: Haruo Ueno, Chiba; Takefumi Yano, Ichihara; Tokuji Inoue, Ichihara; Shigeru Ikai, Ichihara; Yoshiyuki Kai, Ichihara; Michimasa Shimizu, Ichihara, all of Japan

[73] Assignee: UBE Industries, Ltd., Chiba, Japan

[*] Notice: The portion of the term of this patent subsequent to Oct. 27, 1998, has been disclaimed.

[21] Appl. No.: 263,573

[22] Filed: May 14, 1981

[30] Foreign Application Priority Data

May 22, 1980 [JP] Japan .................................. 55-67159

[51] Int. Cl.$^3$ ........................... C08F 4/02; C08F 10/06
[52] U.S. Cl. .............................. 526/128; 252/429 B; 526/125; 526/127; 526/351
[58] Field of Search ................ 526/125, 127, 128, 151

[56] References Cited
U.S. PATENT DOCUMENTS 4,220,554  9/1980  Scata et al. .......................... 526/124
4,242,479 12/1980  Yokota et al. ...................... 526/124
4,297,463 10/1981  Ueno et al. ......................... 526/128

Primary Examiner—Edward J. Smith
Attorney, Agent, or Firm—Burgess, Ryan and Wayne

[57] ABSTRACT

Polyα-olefin, for example, polypropylene, is produced with an excellent yield by bringing, in the presence of an organic acid ester, a feed, containing at least one α-olefin having 3 or more carbon atoms, for example, propylene, into contact with a catalyst which comprises (A) a solid catalytic ingredient prepared (a) by reacting a Grignard compound of the formula, $R^3MgX$ wherein $R^3 = C_{1-8}$ alkyl and X = halogen, with a reaction product of an aluminium halide with an organic silicon compound of the formula, $R_n^1Si(OR^2)_{4-n}$, wherein $R^1 = C_{1-8}$ alkyl or phenyl, $R^2 = C_{1-8}$ alkyl, n = 1, 2 or 3, (b) bringing the resultant reaction product into a first contact with titanium tetrahalide, (c) treating the resultant titanium-containing solid product with an organic acid ester, and, finally, (d) bringing the treated solid product into a second contact with titanium tetrahalide, and; (B) another catalytic ingredient consisting of a trialkyl aluminium of the formula, $AlR_3^4$ wherein $R^4 = C_{2-6}$ alkyl.

24 Claims, No Drawings

METHOD FOR POLYMERIZING α-OLEFIN

FIELD OF THE INVENTION

The present invention relates to a method for polymerizing an α-olefin. More particularly, the present invention relates to a method for polymerizing a feed containing at least one α-olefin having 3 or more carbon atoms.

BACKGROUND OF THE INVENTION

It is known that an α-olefin having 3 or more carbon atoms can be polymerized by using a catalyst composed of a solid catalytic ingredient in which a titanium tetrahalide is carried on a magnesium compound and another component which consists of an organic aluminium compound. With respect to the above-mentioned polymerization, various approaches have been attempted to provide a new method which is effective for increasing the yield of the resultant polymer per unit weight of the solid catalytic ingredient in the catalyst used, to such an extent that the resultant polymer contains a very small content of the used catalyst therein and, therefore, an operation for removing the used catalyst from the resultant polymer can be omitted.

However, the attempted approaches were unsatisfactory due to the following drawbacks.

1. The method failed to increase the yield of the polymer per unit weight of the solid catalytic component to such an extent that the removing operation for the used catalyst could be omitted.
2. The durability in the catalytic activity of the catalyst for the polymerization of the α-olefin is poor.
3. The sensitivity of the catalyst to hydrogen, which is used as a molecular weight-regulating agent for the polymer, is poor. Therefore, a large amount of hydrogen is necessary for regulating the molecular weight of the polymer.

SUMMARY OF THE INVENTION

An object of the present invention is to provide a method for polymerizing an α-olefin having 3 or more carbon atoms by using such a very small amount of a catalyst that it is not necessary to remove the used catalyst from the resultant polymer.

Another object of the present invention is to provide a method for polymerizing an α-olefin having 3 or more carbon atoms by using a catalyst which exhibits an excellent durability in catalytic activity.

A further object of the present invention is to provide a method for polymerizing an α-olefin having 3 or more carbon atoms by using a catalyst which exhibits an excellent sensitivity to hydrogen as a molecular weight-regulating agent for the resultant polymer.

The above-mentioned objects can be attained by the method of the present invention which comprises bringing, in the presence of an organic acid ester, a feed containing at least one α-olefin, having 3 or more carbon atoms, into contact with a catalyst comprising (A) a solid catalytic ingredient which has been prepared in such a manner that (a) a Grignard compound of the formula (I):

$$R^3MgX \quad (I)$$

wherein $R^3$ represents an alkyl radical having 1 to 8 carbon atoms and X represents a halogen atom, is reacted with a reaction product of an aluminium halide with an organic silicon compound of the formula (II):

$$R_n^1Si(OR^2)_{4-n} \quad (II)$$

wherein $R^1$ represents a member selected from the group consisting of alkyl radicals having 1 to 8 carbon atoms and a phenyl radical, $R^2$ represents an alkyl radical having 1 to 8 carbon atoms and n represents an integer of 1, 2 or 3, (b) the resultant solid reaction product is brought into a first contact with a titanium tetrahalide, (c) the resultant titanium-containing solid product is treated with an organic acid ester and, finally, (d) the resultant treated solid product is brought into a second contact with a titanium tetrahalide, and (B) another catalytic ingredient consisting of at least one trialkyaluminium of the formula (III):

$$AlR_3^4 \quad (III)$$

wherein $R^4$ represents an alkyl radical having 2 to 6 carbon atoms.

DETAILED DESCRIPTION OF THE INVENTION

In the method of the present invention, it is essential that the polymerization of at least one α-olefin having 3 or more carbon atoms and contained in a feed is carried out in the presence of an organic acid ester and in the presence of a specific catalyst.

In the specific catalyst, a solid catalytic ingredient is prepared in an atmosphere consisting of an inert gas, for example, nitrogen and argon gases, from a reaction product of an aluminium halide with a specific organic silicon compound, a Grignard compound, a titanium tetrahalide and an organic acid ester, all of which contain substantially no water therein.

The aluminium halide is usually selected from the group consisting of aluminium chloride, aluminium bromide and aluminium iodide. The most useful aluminium halide is aluminium chloride.

The organic silicon compound of the formula (II), $R_n^1Si(OR^2)_{4-n}$, may be selected from the group consisting of methyl trimethoxysilane, methyl triethoxysilane, methyl tri-n-butoxysilane, methyl tri-iso-pentoxysilane, methyl tri-n-hexoxysilane, methyl tri-iso-octoxysilane, ethyl triethoxysilane, ethyl tri-iso-propoxysilane, ethyl tri-iso-pentoxysilane, n-butyl triethoxysilane, isobutyl triethoxysilane, isopentyl triethoxysilane, iso-pentyl tri-n-butoxysilane, dimethyl diethoxysilane, dimethyl-di-n-butoxysilane, dimethyl di-iso-pentoxysilane, diethyl diethoxysilane, diethyl di-iso-pentoxysilane, di-n-butyl diethoxysilane, di-iso-butyl di-iso-pentoxysilane, trimethyl methoxysilane, trimethyl ethoxysilane, trimethyl isobutoxysilane, triethyl isopropoxysilane, tri-n-propyl ethoxysilane, tri-n-butyl ethoxysilane, tri-iso-pentyl ethoxysilane, phenyl triethoxysilane, phenyl tri-iso-butoxysilane, phenyl tri-iso-pentoxysilane, diphenyl diethoxysilane, diphenyl di-iso-pentoxysilane, diphenyl dioctoxysilane, triphenyl methoxysilane, triphenyl ethoxysilane and triphenyl isopentoxysilane.

In the preparation of the reaction product of the aluminium halide and the organic silicon compound, it is preferable that the aluminium halide is used in an amount of from 0.25 to 10 moles, more preferably from 0.25 to 2 moles, per mole of the organic silicon compound. The reaction of the aluminium chloride with the organic silicon compound is usually carried out by stirring a solution of both the aluminium halide and the organic silicon compound in an inert organic solvent, at a temperature of from −50° C. to 100° C. for 0.1 to two hours. This reaction is exothermic and the resultant reaction product is obtained in the form of a solution in the inert organic solvent. Usually, the reaction product is not isolated from the solution. That is, the solution of the reaction product is used for the reaction with the Grignard compound.

The inert organic solvent comprises at least one compound selected from the group consisting of aliphatic and aromatic hydrocarbons, for example, hexane, heptane, benzene and toluene, and halogenated aliphatic and aromatic hydrocarbons, for example, chlorobenzenes, dichlorohexane and dichloroheptane.

The Grignard compound usable for the method of the present invention is of the formula (I). In the formula (I), it is preferable that X represents a chlorine atom. That is, the Grignard compound is preferably selected from methylmagnesium chloride, ethylmagnesium chloride, n-butylmagnesium chloride and n-hexylmagnesium chloride.

Also, it is preferable that the Grignard compound is used in an amount of from 0.05 to 4 moles, more preferably, from 1.5 to 2 moles, per mole of the organic silicon compound which has been reacted with the aluminium halide.

The reaction of the Grignard compound with the aluminium halide-organic silicon compound reaction product in Step (a) can be carried out in any of the conventional reaction methods. For example, it is preferable that a solution of the Grignard compound in an ether, or a mixture of the ether and an aromatic hydrocarbon, is gradually added to a solution of the aluminium halide-organic silicon compound reaction product in the inert organic solvent. Also, it is preferable that the solution of the aluminium halide-organic silicon compound reaction product is added to the solution of the Grignard compound. The above-mentioned ether is preferably selected from those of the formula $R^5-O-R^6$, wherein $R^5$ and $R^6$ represent an alkyl radical having 2 to 8 carbon atoms, respectively. The preferable ethers are diethyl ether, di-isopropyl ether, di-n-butyl ether, and di-isoamyl ether.

The reaction of the Grignard compound with the aluminium halide-organic silicon compound reaction product in Step (a) is usually carried out at a temperature of from −50° to 100° C., preferably, from −20° to 25° C., for a period of time sufficient for completing the reaction, usually, about 5 minutes or more. The reaction in Step (a) results in precipitation of a solid white reaction product from the reaction mixture.

The resultant solid reaction product in Step (a) is separated from the reaction mixture. The separated solid reaction product can be directly subjected to Step (b). However, it is preferable that the separated solid reaction product is washed with an inert organic solvent, for example, benzene, toluene, hexane and heptane.

In Step (b), the solid reaction product is first brought into contact with a titanium tetrahalide, so as to allow at least a portion of the titanium used to be incorporated into the solid reaction product. The titanium tetrahalide to be used in Step (b) is preferably selected from titanium tetrachloride, titanium tetrabromide and titanium tetraiodides. The most preferable titanium tetrahalide is titanium tetrachloride. Also, in Step (b), it is preferable that the titanium tetrahalide is used in an amount of one mole or more, more preferably, from 2 to 100 moles, per mole of the Grignard compound used in Step (a). In Step (b), the first contact of the solid reactant product with the titanium tetrahalide is carried out in the presence or absence of an inert organic solvent, for example, benzene, toluene, hexane and heptane, at a temperature of from 20° to 200° C., preferably, from 60° to 140° C., for a period of time sufficient for completing the first contact, usually, from 0.5 to three hours.

After the first contact in Step (b) is completed, the resultant titanium-containing solid product is separated from the contacting mixture by means of filtration or decantation. The separated product is washed with an inert organic solvent and then subjected to the treatment in Step (c). The separated product contains 0.1 to 10% by weight of titanium.

The organic acid ester to be used in Step (c) can be selected from aliphatic carboxylic acid esters, aromatic carboxylic acid esters and cycloaliphatic carboxylic acid esters. However, it is preferable that the organic acid ester is selected from the aromatic carboxylic acid esters of the formula:

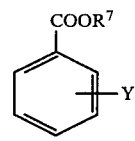

wherein $R^7$ represents an alkyl radical having 1 to 6 carbon atoms and Y represents a member selected from the group consisting of a hydrogen atom, alkyl radicals having 1 to 4 carbon atoms and radicals of the formula-$OR^8$ in which $R^8$ represents an alkyl radical having 1 to 4 carbon atoms. The preferable organic acid esters for Step (c) are methyl benzoate, ethyl benzoate, methyl toluate, ethyl toluate, methyl anisate and ethyl anisate. Also, it is preferable that the organic acid ester is used in an amount of from 0.1 to 10 millimoles per gram of the titanium-containing solid product to be used in Step (c).

The treatment of Step (c) can be effected by the any of the conventional treating methods for a titanium-containing solid material with an organic acid ester. However, in a preferable method, the titanium-containing solid product is suspended in an inert organic solvent, and the organic acid ester is added to the suspension while stirring the mixture, at a temperature of from 0° to 200° C., preferably, from 5° to 150° C. for a period of time sufficient for completing the treatment, usually 5 minutes or more.

The resultant treated solid product in Step (c) is separated from the treating mixture by means of filtration or decantation, and, then, washed with an inert organic solvent.

The separated solid product is subjected to a second contact with a titanium tetrahalide in Step (d).

The second contact operation can be effected in the same manner as that in Step (b) so as to allow at least a portion of titanium to be incorporated in the solid product. When the second contact operation is completed, the resultant solid catalytic ingredient is separated from the second contacting mixture by means of filtration or decantation and, finally, washed with an inert organic solvent. The separated solid catalytic ingredient contains 0.5 to 5% by weight of titanium.

The resultant solid catalytic ingredient is used concurrently with another catalytic ingredient consisting of at least one trialkyl aluminium of the formula (III). The preferable trialkylaluminiums for the present invention are triethyl aluminium, tri-isobutyl aluminium and tri-n-hexyl aluminium. The most useful trialkyl aluminiums are triethyl aluminium and tri-isobutyl aluminium.

The trialkyl aluminium is usually used in an amount of from 1 to 1,000 moles per gram atom of titanium contained in the solid catalytic ingredient.

In the method of the present invention, the feed to be brought into contact with the catalyst contains at least one α-olefin having 3 or more carbon atoms. The α-olefin may be selected from the group consisting of propylene, 1-butene, 4-methyl-1-pentene and 1-hexane. The feed may consists of either only one α-olefin having 3 or more carbon atoms or a mixture of two or more different α-olefins each having 3 or more carbon atoms. In the former case, the polymerization product is a homopolymer of the α-olefin and, in the later case, a copolymer of two or more different α-olefins is obtained.

Also, the feed may consist of a mixture of at least one α-olefin having 3 or more carbon atoms with ethylene. In this case, ethylene is copolymerized with the α-olefin.

The feed is brought into contact with the catalyst in the presence of an organic acid ester. This organic acid ester can be selected from the same group as that for the organic acid esters to be used in Step (c). In the polymerization mixture, the organic acid ester is presented in an amount of from 0.05 to 0.6 moles per mole of the trialkyl aluminium in the catalyst.

The polymerization mixture may contain a polymerization medium, that is, an inert organic solvent consisting of at least one member selected from benzene, toluene, hexane and heptane. Also, the polymerization mixture may not contain the polymerization medium.

The catalyst is suspended in any concentration in the polymerization mixture. Usually, the concentration of the catalyst is in a range of from 0.001 to 10 millimoles, in terms of element titanium contained in the catalyst, per liter of the polymerization mixture, and in a range of from 0.01 to 1,000 millimoles, in terms of trialkyl aluminium contained in the catalyst, per liter of the polymerization mixture.

In the method of the present invention, the polymerization operation can be carried out in the same manner as that for the polymerization operation of the α-olefin using a Ziegler-Natta type catalyst. That is, the polymerization is carried out in the substantial absence of water and molecular oxygen. The polymerization temperature is usually in a range of from 30° to 100° C. and the polymerization pressure is usually in a range of from 1 to 80 kg/cm².

The method of the present invention can produce a poly-α-olefin with a remarkably high degree of yield per a unit weight of the solid catalytic ingredient contained in the catalyst used. Therefore, it is not necessary to remove the residual catalyst from the resultant polymer.

Also, in the method of the present invention, the catalyst exhibits an excellent durability in the catalytic activity thereof. Therefore, polymerization can be effected stably.

Furthermore, the catalyst exhibits an excellent sensitivity to hydrogen which is used as a molecular weight regulating agent for the resultant polymer. Therefore, when the catalyst of the present invention is used, it is easy to regulate the molecular weight of the resultant polymer by using a small amount of hydrogen.

The specific examples presented hereinafter will serve to more fully explain how the present invention is practiced. However, it will be understood that these examples are only illustrative and in no way limit the scope of the present invention.

In the examples, the term "polymerization activity" used refers to a yield in grams of a resultant polymer per gram of a solid catalytic ingredient contained in a catalyst, per hour of polymerization time.

Also, the term "H.I." refers to a ratio in percent of the weight of a residue remaining after a polymer is extracted with boiling n-heptane for twenty hours, to the entire weight of the polymer.

Furthermore, the term "M.I." used in the examples refers to a melt flow index of a polymer which has been measured at a temperature of 230° C. under a load of 2.16 kg/cm² in accordance with ASTM D1238.

The preparation of a solid catalytic ingredient in each example, was carried out in a dry nitrogen atomosphere.

EXAMPLE 1

1. Preparation of Solid Catalytic Ingredient

A reaction product of aluminium chloride with methyl triethoxysilane was prepared in such a manner that 15 millimoles of anhydrous aluminium chloride were suspended in 40 ml of toluene, 15 millimoles of methyl triethoxysilane were added to the aluminium chloride suspension. The mixture was stirred at a temperature of 25° C. for 30 minutes, and then, heated at a temperature of 60° C. for one hour.

The resultant reaction mixture was cooled to a temperature of −5° C., and a solution of 27 millimoles of n-butylmagnesium chloride in 18 ml of di-isoamyl ether was added dropwise to the cooled reaction mixture over 30 minutes while stirring the mixture. During this addition procedure, the temperature of the mixture was maintained at −5° C. After the dropwise addition was completed, the reaction mixture was heated at a temperature of 30° C. for one hour so as to continue the reaction. A solid product was precipitated from the reaction mixture. The solid product was filtered and washed with toluene.

4.90 g of the resultant solid reaction product were suspended in 25 ml of toluene, and 150 millimoles of titanium tetrachloride were added to the suspension. The mixture was stirred at a temperature of 90° C. for one hour so as to allow the solid product to come into contact with titanium tetrachloride. The resultant titanium-containing solid product was filtered at 90° C., and washed with toluene. 4.10 g of the titanium-containing solid product were suspended in 25 ml of toluene, 6.5 millimoles of ethyl benzoate were added to the suspension, and the mixture was stirred at a temperature of 90° C. for one hour. The ester-treated solid product was filtered at 90° C. and washed with n-heptane and, then, with toluene.

The resultant treated solid product was suspended in 25 ml of toluene, 150 millimoles of titanium tetrachloride were added to the suspension, and, then, the mixture was stirred at a temperature of 90° C. for one hour so as to bring the treated solid product into contact with titanium tetrachloride. The resultant solid catalytic ingredient was separated from the mixture at 90° C. by means of filtration, and washed with n-heptane.

The resultant solid catalytic ingredient in an amount of 3.50 g was suspended in 80 ml of n-heptane. The solid catalytic ingredient contained 2.7% by weight of titanium.

2. Polymerization

The suspension containing 8.4 mg of the solid catalytic ingredient was placed in a glass ampoule and the ampoule was sealed. The ampoule was placed in a 1-liter autoclave with a stirrer, and, thereafter, the autoclave was closed and air in the autoclave was replaced by nitrogen gas.

The autoclave was charged with 6.6 ml of a solution of 0.12 millimoles of p-methyl toluate in n-heptane and, then, with 1.7 ml of another solution of 0.47 millimole of triethyl aluminium in n-heptane.

Next, 600 ml of liquid propylene were introduced into the autoclave, and the autoclave was shaken.

When the temperature of the content in the autoclave reached 65° C., a stirring operation was applied to the content in the autoclave so as to break the glass ampoule, and to start the polymerization of propylene. The polymerization operation was continued at a temperature of 65° C. for one hour.

After the polymerization was completed, non-reacted propylene was discharged from the autoclave, and the broken glass ampoule was removed from the polymerization mixture. The resultant polypropylene was dried at a temperature of 50° C. under a vacuum condition for 20 hours.

123 g of white polypropylene powder were obtained. The polypropylene exhibited an M.I. of 0.1 g/10 minutes and an H.I. of 94.7%. The polymerization activity was 14,700.

EXAMPLE 2

The same procedures as those described in Example 1 were carried out, except that the triethyl aluminium was used in an amount of 0.95 millimoles and the p-methyl toluate was used in an amount of 0.24 millimoles. The yield of polypropylene was 129 g. The polypropylene exhibited an H.I. of 94.0%. The polymerization activity was 15,400.

EXAMPLES 3 THROUGH 5

In each of Examples 3 through 5, the same procedures as those mentioned in Example 2 were carried out, except that in the polymerization, p-methyl toluate was used in an amount as indicated in Table 1.

The results of Examples 3 through 5 are indicated in Table 1.

TABLE 1

| Example No. | Amount of p-methyl toluate (millimole) | Polymerization activity | H.I. (%) |
|---|---|---|---|
| 3 | 0.19 | 7,300 | 94.7 |
| 4 | 0.16 | 9,940 | 93.0 |
| 5 | 0.13 | 13,500 | 91.6 |

EXAMPLES 6 AND 7

In each of Examples 6 and 7, the same procedures as those described in Example 2 were carried out, except that before the liquid propylene was introduced, hydrogen gas was introduced into the autoclave so that the pressure on the gauge in the autoclave reached the value as indicated in Table 2. The results are indicated in Table 2.

TABLE 2

| Example No. | Pressure of hydrogen (kg/cm$^2$) | Polymerization activity | H.I. (%) | M.I. (g/10 min) |
|---|---|---|---|---|
| 6 | 0.5 | 17,900 | 92.0 | 1.2 |
| 7 | 0.9 | 19,250 | 90.5 | 2.4 |

EXAMPLE 8

Procedures identical to those described in Example 4 were carried out, except that the polymerization procedure was carried out for 1.5 hours. The resultant polypropylene exhibited an H.I. of 93.2%. The polymerization activity was 11,660.

EXAMPLE 9

Procedures identical to those described in Example 4 were carried out, except that the polymerization temperature was 75° C. The resultant polypropylene exhibited an H.I. of 93.2%. The polymerization activity was 12,689.

EXAMPLE 10

Procedures identical to those as described in Example 2 were carried out, except that 0.95 millimoles of tri-isobutyl aluminium were used in place of the triethyl aluminium. The polymerization activity was 15,800 and the resultant polypropylene was exhibited an H.I. of 93.6%.

EXAMPLE 11

Procedures identical to those as described in Example 2 were carried out, except that 27 millimole of ethyl magnesium chloride were used in place of the n-butyl magnesium chloride. The polymerization activity was 15,300 and the H.I. of the resultant polypropylene was 94.2%. The content of titanium in the solid catalytic ingredient was 2.6% by weight.

EXAMPLE 12

The same procedures as those described in Example 1 were carried out, except that 22.5 millimoles of dimethyl diethoxysilane were used in place of the methyl triethoxysilane.

The polymerization activity was 14,700 and the H.I. of the resultant polypropylene was 94.6%. The content of titanium in the solid catalytic ingredient was 3.0% by weight.

EXAMPLE 13

The same procedures as those described in Example 12 were carried out, except that the dimethyl diethoxysilane was used in an amount of 15 millimoles.

The polymerization activity was 10,350 and the H.I. of the resultant polypropylene was 93.2%. The content of titanium in the solid catalytic ingredient was 3.1% by weight.

EXAMPLE 14

The same procedures as those mentioned in Example 2 were carried out, except that 15 millimoles of phenyl triethoxysilane were used in place of the methyl triethoxysilane. The content of titanium in the solid catalytic ingredient was 3.1% by weight.

The polymerization activity was 13,600 and the H.I. of the resultant polypropylene was 94.5%.

EXAMPLE 15

The same procedures as those described in Example 2 were carried out, except that 15 millimoles of phenyl triethoxysilane were used in place of the methyl triethoxysilane, and the titanium-containing solid reaction product was suspended in 25 ml of chlorobenzene in place of the toluene. The content of titanium in the solid catalytic ingredient was 3.0% by weight. The polymerization activity was 13,300 and the H.I. of the resultant polypropylene was 95.3%.

EXAMPLE 16

Procedures identical to those described in Example 2 were carried out, except that 15 millimoles of phenyl triethoxysilane were used in place of the methyl triethoxysilane, and the solid reaction product of the Grignard compound with the reaction product of the aluminium chloride with the methyl triethoxysilane was suspended in 25 ml of chlorobenzene in place of the toluene. The content of titanium in the solid catalytic ingredient was 3.3% by weight. The polymerization activity was 14,000 and the H.I. of the resultant polypropylene was 95.1%.

We claim:

1. A method for polymerizing an α-olefin which comprises bringing, in the presence of an organic acid ester, a feed containing at least one α-olefin having 3 or more carbon atoms into contact with a catalyst comprising (A) a solid catalytic ingredient which has been prepared in such a manner that (a) a Grignard compound of the formula (I):

$$R^3M_gX \qquad (I)$$

wherein $R^3$ represents an alkyl radical having 1 to 8 carbon atoms and X represents a halogen atom, is reacted with a reaction product of an aluminium halide with an organic silicon compound of the formula (II):

$$R_n^1Si(OR^2)_{4-n} \qquad (II)$$

wherein $R^1$ represents a member selected from the group consisting of alkyl radicals having 1 to 8 carbon atoms and a phenyl radical, $R^2$ represents an alkyl radical having 1 to 8 carbon atoms and n represents an integer of 1, 2 or 3, (b) the resultant solid reaction product is brought into a first contact with a titanium tetrahalide, (c) the resultant titanium-containing solid product is treated with an organic acid ester and, finally, (d) the treated solid product is brought into a second contact with a titanium tetrahalide; and (B) another catalytic ingredient consisting of at least one trialkyl aluminium of the formula (III):

$$AlR_3^4 \qquad (III)$$

wherein $R^4$ represents alkyl radical having 2 to 6 carbon atoms.

2. A method as claimed in claim 1, wherein said α-olefin is selected from the group consisting of propylene, 1-butene, 4-methyl-1-pentene and 1-hexene.

3. A method as claimed in claim 1, wherein the contact of said feed with said catalyst is carried out at a temperature of from 30° to 100° C.

4. A method as claimed in claim 1, wherein the contact of said feed with said catalyst is effected under a pressure of from 1 to 80 kg/cm².

5. A method as claimed in claim 1, wherein said aluminium halide is selected from the group consisting of aluminium chloride, aluminium bromide and aluminium iodide.

6. A method as claimed in claim 1, wherein aluminium halide is used in an amount of from 0.25 to 10 moles per mole of said organic silicon compound.

7. A method as claimed in claim 1, wherein the reaction of said aluminium halide with said organic silicon compound is carried out at a temperature of from −50° to 100° C. in an inert solvent.

8. A method as claimed in claim 1, wherein said Grignard compound is used in an amount of from 0.05 to 4 moles per mole of said organic silicon compound.

9. A method as claimed in claim 1, wherein said reaction of Step (a) is carried out at a temperature of from −50° to 100° C.

10. A method as claimed in claim 1, wherein the solid reaction product in Step (a) is washed with an inert organic solvent consisting of at least one member selected from the group consisting of benzene, toluene, hexane and heptane.

11. A method as claimed in claim 1, wherein said titanium tetrahalide to be used in Step (b) is selected from titanium tetrachloride, titanium tetrabromide, and titanium tetraiodide.

12. A method as claimed in claim 1, wherein Step (b), said titanium tetrahalide is used in an amount of at least one mole per mole of said Grignard compound used in Step (A).

13. A method as claimed in claim 1, wherein the first contact of said solid reaction product with said titanium tetrahalide in Step (b) is carried out at a temperature of from 20° to 200° C.

14. A method as claimed in claim 1, wherein the titanium-containing solid product prepared in Step (b) contains 0.5 to 10% by weight of titanium.

15. A method as claimed in claim 1, wherein said organic acid ester to be used in Step C is selected from the group consisting of aliphatic carboxylic acid esters, aromatic carboxylic acid esters and cycloaliphatic carboxylic acid esters.

16. A method as claimed in claim 1, wherein said organic acid ester to be used in Step (c) is selected from aromatic carboxylic acid esters of the formula:

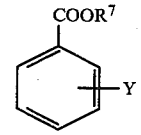

where $R^7$ represents alkyl radicals having 1 to 6 carbon atoms and Y represents a member selected from the group consisting of a hydrogen atom, alkyl radicals having 1 to 4 carbon atoms and radicals of the formula, $OR^8$, in which $R^8$ represents an alkyl radical having 1 to 4 carbon atoms.

17. A method as claimed in claim 1, wherein Step (c), said organic acid ester is used in an amount of from 0.1 to 10 millimoles per gram of said titanium-containing solid product.

18. A method as claimed in claim 1, wherein said treatment in Step (c) is carried out at a temperature of from 0° to 200° C.

19. A method as claimed in claim 1, wherein said solid catalytic ingredient contains 0.5 to 5% by weight of titanium.

20. A method as claimed in claim 1, wherein said trialkyl aluminium is used in an amount of from 1 to 1000 moles per gram atom of titanium contained in said solid catalytic ingredient.

21. A method as claimed in claim 1, wherein said organic acid ester presented in said polymerization mixture is used in an amount of from 0.05 to 0.6 moles per mole of trialkyl aluminium contained in said catalyst.

22. A method as claimed in claim 1, wherein said catalyst is suspended in the polymerization mixture.

23. A method as claimed in claim 22, wherein said catalyst suspended in said polymerization is in an amount, in terms of elemental titanium, of 0.001 to 10 milligram atoms per liter of said polymerization mixture.

24. A method as claimed in claim 22, wherein said catalyst suspended in said polymerization mixture is in an amount, in terms of the trialkyl aluminium, of 0.01 to 1,000 millimoles per liter of said polymerization mixture.

* * * * *